US006634403B1

(12) United States Patent
Bluemle

(10) Patent No.: US 6,634,403 B1
(45) **Date of Patent: *Oct. 21, 2003**

(54) WINDOW BONDING STATION

(75) Inventor: Martin Bluemle, Horhausen (DE)

(73) Assignee: Winkler + Duennebier AG, Neuwied (DE)

( * ) Notice: Subject to any disclaimer, the term of this patent is extended or adjusted under 35 U.S.C. 154(b) by 47 days.

This patent is subject to a terminal disclaimer.

(21) Appl. No.: 09/767,371

(22) Filed: Jan. 22, 2001

(30) Foreign Application Priority Data

Jan. 21, 2000 (DE) ........................................ 100 02 544

(51) Int. Cl.[7] ................................................ B32B 31/20

(52) U.S. Cl. ....................... 156/539; 156/556; 156/566; 156/299; 493/222; 493/256; 493/919

(58) Field of Search ................................ 156/297, 299, 156/302, 538, 539, 542, 556, 566, 567, 441.5–442.4; 425/373; 493/210, 220, 222, 256, 919, 397

(56) References Cited

U.S. PATENT DOCUMENTS

| | | | | |
|---|---|---|---|---|
| 3,618,935 A | | 11/1971 | Howatt | |
| 4,029,537 A | * | 6/1977 | Kish | 156/497 |
| 4,108,710 A | * | 8/1978 | Hoffmann | 156/450 |
| 5,057,181 A | * | 10/1991 | Mundus | 156/510 |
| 5,429,576 A | * | 7/1995 | Doderer-Winkler | 156/517 |
| 6,530,869 B2 | * | 3/2003 | Bluemle | 493/279 |

FOREIGN PATENT DOCUMENTS

| | | |
|---|---|---|
| DE | 1001581 | 6/1957 |
| EP | 0095890 | 12/1983 |

* cited by examiner

*Primary Examiner*—Michael W. Ball
*Assistant Examiner*—Jessica Rossi
(74) *Attorney, Agent, or Firm*—W. F. Fasse; W. G. Fasse

(57) ABSTRACT

In an apparatus for bonding window pieces to envelope blanks having window cut-outs, window pieces are cut from a transparent material web and then the window pieces and envelope blanks are brought together by a suction roller serving as a bonding cylinder and joined to one another by adhesive applied onto the window pieces by a gluing mechanism while the window piece is on the suction roller before being joined to the envelope blank. A suction belt conveyor device is provided, at least in the region of the joining location, as a carrier for the envelope blanks and as a counter-tool for the suction roller serving as a bonding cylinder.

13 Claims, 4 Drawing Sheets

WINDOW BONDING STATION

FIELD OF THE INVENTION

The invention relates to a window bonding station for an envelope machine, in other words, to an apparatus for bonding prefabricated cut-to-size window pieces consisting of transparent window material to envelope blanks having window cut-outs.

BACKGROUND INFORMATION

The cut-to-size window pieces are separated from a web consisting of window material and joined to the envelope blanks with the aid of adhesive. A distinction is made here between two different and fundamentally known concepts. The adhesive may either be applied to the envelope blanks or to the uncut web of window material, from which the cut-to-size window pieces are subsequently separated. The parts provided with adhesive in each case are then fed to a bonding cylinder designed as a suction roller and there joined to the parts having no adhesive.

The web consisting of transparent window material runs, in principle, more slowly than the paper web for the envelope blanks. The cut-to-size window pieces are smaller and shorter in the direction of conveyance than the cut-to-size pieces for the envelope blanks, so that the cut-to-size window pieces have to be accelerated to the speed of the envelope blanks before joining.

It is also necessary to control these different speeds within close tolerances, since otherwise the cut-to-size window pieces will not align exactly with the window cut-outs in the envelope blanks. A final requirement is that the joining station at which the window material is laid on the envelope blank and joined with the aid of adhesive is as large as possible in area and not linear.

SUMMARY OF THE INVENTION

It is therefore an object of the invention to provide measures whereby the said difficulties can be controlled more easily than previously. In addition, a compact structure of the apparatus is desired.

To achieve this object, the invention provides a suction belt conveyor device, at least in the region of the joining station or location, as a carrier for the envelope blanks and as a counter-tool for the suction roller serving as an adhesive bonding cylinder.

A suction belt conveyor device with one or more suction belts forms, as a counter-tool for the bonding cylinder, a much larger contact surface than, for example, a counter-roller. Conveyor belts can in principle adapt to a cylindrical contour of a bonding cylinder and are therefore able to generate a contact surface which is much greater than a merely linear joining station.

In a further development of the invention, it is also envisaged that the conveyor belt or belts are moved in an arcuate manner in the region of the suction roller serving as a bonding cylinder. In this case, the conveyor belt or belts are diverted at least partially into a trough at the contact station. The effect of this is to guarantee that the cut-to-size window pieces consisting of window material and the envelope blanks enter into a reliable adhesive bond with one another.

Further features of the invention are apparent from the dependent claims in conjunction with the description and the drawing.

BRIEF DESCRIPTION OF THE DRAWINGS

The invention is explained in detail below with reference to examples of embodiment in comparison with the prior art. In the drawing.

DETAILED DESCRIPTION OF PREFERRED EXAMPLE EMBODIMENTS OF THE INVENTION

Figure 1:
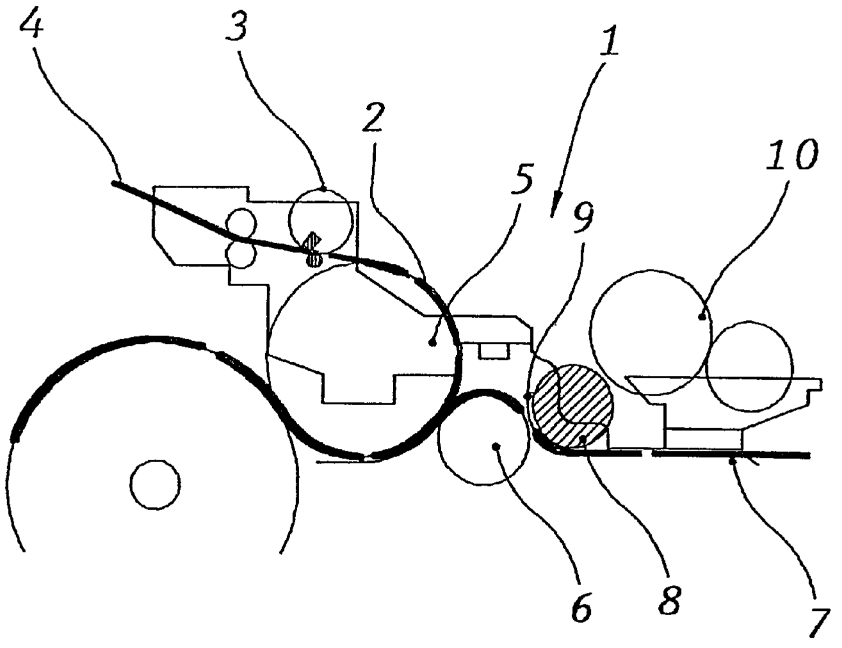
FIG. 1 PRIOR ART
FIG. 1 shows a basic diagram of a first apparatus of the type that is of interest here, forming part of the prior art.

A known apparatus 1 for sticking in prefabricated cut-to-size window pieces 2 consisting of transparent window material comprises a cutter roller 3, with the aid of which the cut-to-size window pieces 2 are separated from a material web 4 consisting of window material. Downstream of the cutter roller 3 in the conveying direction is a suction roller 5, to which is assigned a deflection roller 6 rotating at the same circumferential speed. The deflection roller 6 feeds envelope blanks, wetted with adhesive, to the suction roller 5 serving as a bonding cylinder. Also assigned to the deflection roller 6 is a gluing roller 8 which bears at least one gluing element 9, with the aid of which glue from a gluing mechanism 10 is applied to each envelope blank 7.

Figure 2:
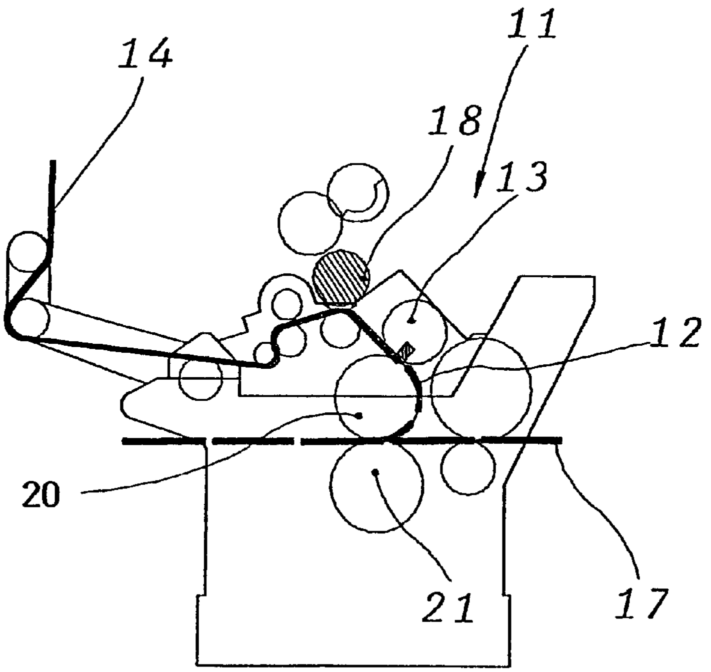
FIG. 2 PRIOR ART
FIG. 2 shows a basic diagram of another apparatus forming part of the prior art.

In the apparatus 11 likewise diagrammatically shown in FIG. 2 and forming part of the prior art, glue is initially applied with the aid of a gluing roller 18 forming part of a gluing mechanism (not shown) to the material web 14 for the cut-to-size window pieces. The cutter roller 13 is arranged only downstream of the gluing roller 18 in the conveying direction and interacts with a counter-roller 20 in the separation of the cut-to-size window pieces 12. The counter-roller 20 also comprises a contact pressure roller 21 running at the same circumferential speed. Not only the separated cut-to-size window pieces 12 wetted with adhesive but also envelope blanks 17 are fed to the roller gap between the counter-roller 20 and the contact pressure roller 21 and joined to one another between the counter-roller 20 and the contact pressure roller 21.

Figure 3:
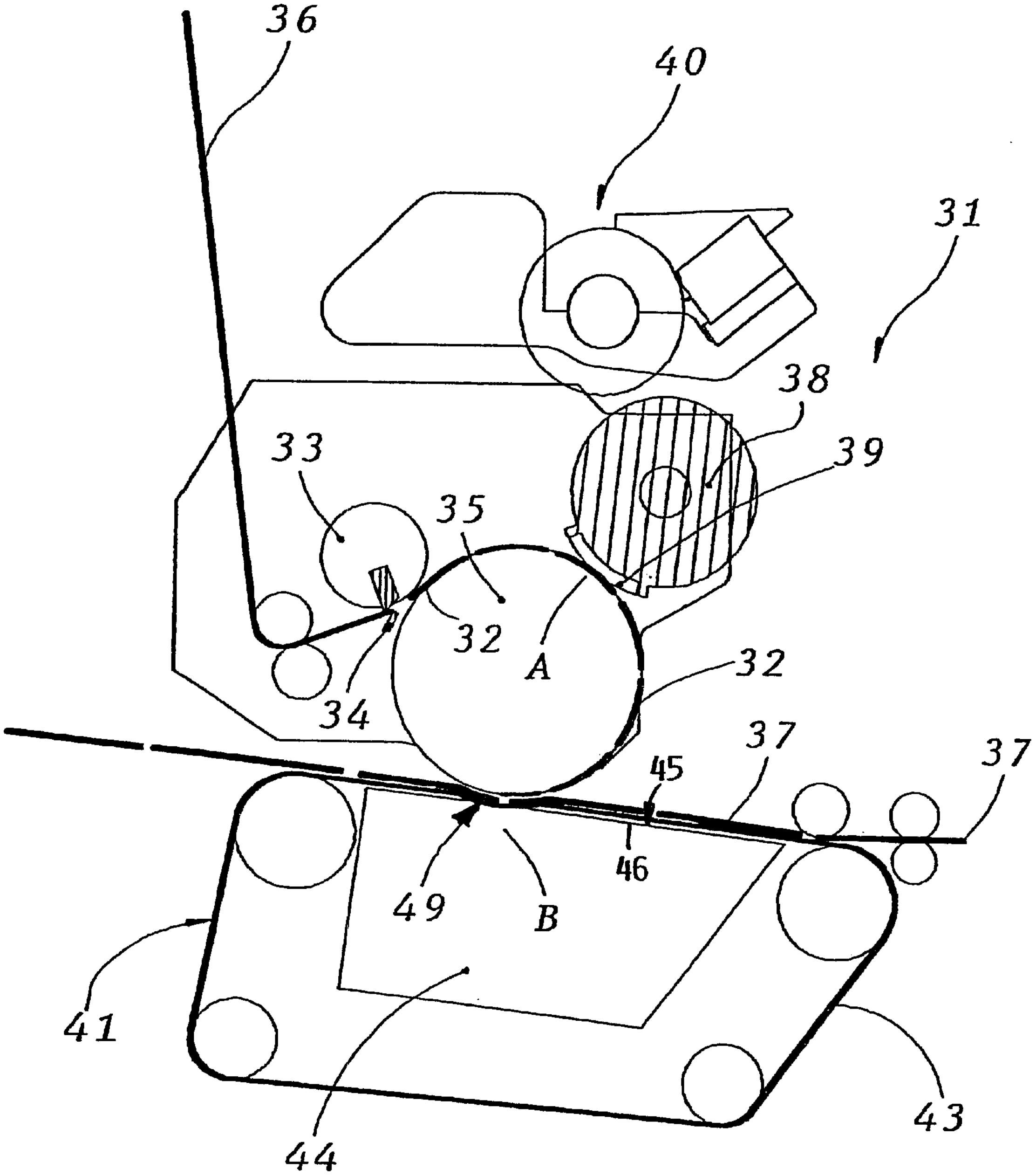
FIG. 3 shows a basic diagram of the apparatus according to the invention.

The apparatus 31 for bonding prefabricated cut-to-size window pieces 32 consisting of transparent window material to the edges of window cut-outs in envelope blanks 37 according to FIG. 3 is much simpler and has fewer components than the apparatuses 1 and 11 forming part of the prior art. It comprises, as in the case of the apparatus 1 according to FIG. 1, a cutter roller 33 and a counter-tool 34 for the cut-to-size window pieces 32. The cutter roller 33 and the counter-tool 34 are arranged directly upstream of a suction roller 35 serving as a bonding cylinder and separate the material web 36 of window material into the individual cut-to-size window pieces 32.

The gluing roller 38 with at least one gluing element 39 and with the gluing mechanism 40 are assigned to the suction roller 35, so that the gluing roller 38 applies the adhesive to the cut-to-size window pieces 32 when the latter are located on the suction roller 35 serving as a bonding cylinder.

The previously separated envelope blanks 37 are also passed directly to the suction roller 35 in a manner such that a cut-to-size window piece 32, on contact, comes to rest over the window cut-out in the envelope blank 37 and can be bonded thereto with the aid of the adhesive.

FIG. 3 additionally shows, in this context, that the cut-to-size window piece 32 is located, during the application of glue, on the suction roller 35 in a position A which lies less than 1800 ahead of position B, in which the cut-to-size window piece 32 and the envelope blank 37 are joined to one another.

The envelope blanks 37 are conveyed to the suction roller 35 serving as a bonding cylinder with the aid of a suction belt conveyor device 41. However, this suction belt conveyor device 41 serves not only as a carrier for the envelope blanks 37 but also, at the same time, as a counter-tool for the suction roller 35 provided as a bonding cylinder.

Figure 4:
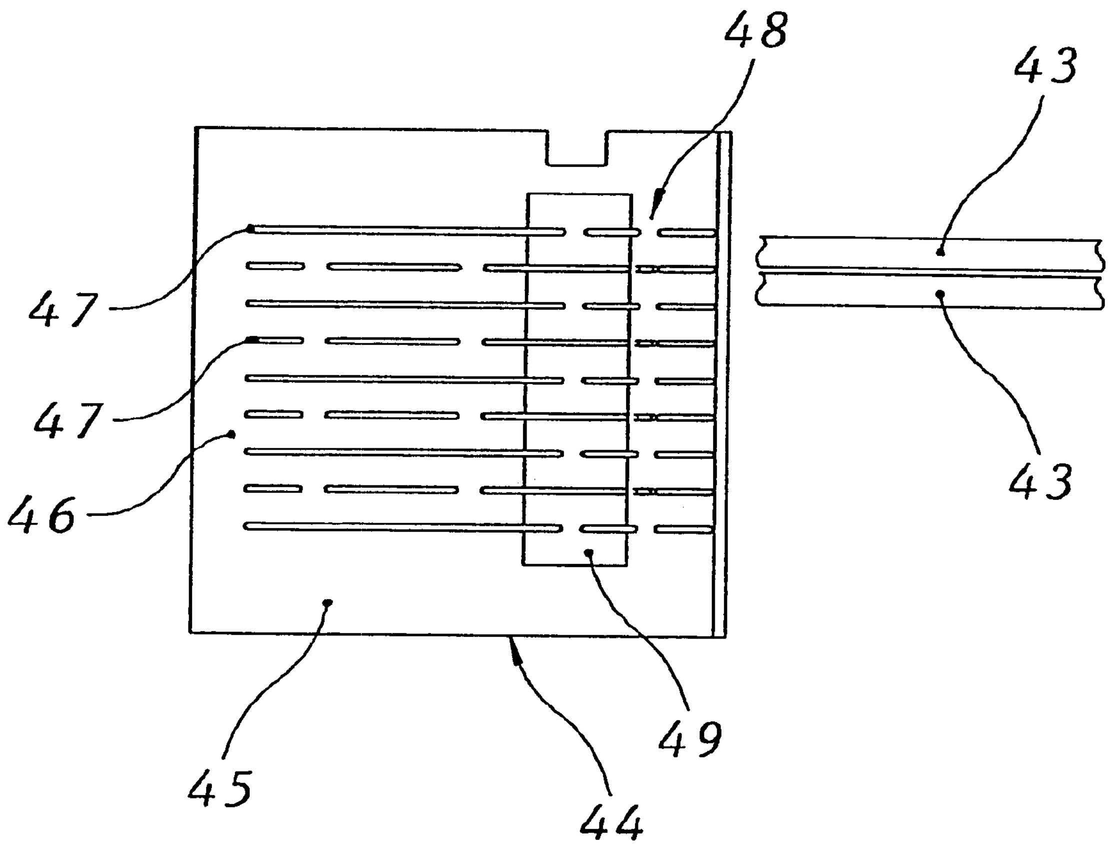
FIG. 4 shows a plan view of a suction box on a different scale.

The suction belt conveyor device 41 comprises at least one, or according to the example embodiment a plurality of, conveyor belts 43 arranged at a distance apart and parallel to one another, and at least one suction box 44, which serves as a carrier for the upper strand of the conveyor belts 43. The conveyor belt or belts 43 may also have suction holes or apertures and lie directly on the top 45 of the suction box 44 and slide over the cover plate 46 thereof in operation (also see FIG. 4).

The cover plate 46 of the suction box 44 has, corresponding to the position of the conveyor belts 43, a plurality of apertures or slits 47 extending in the conveying direction and interrupted by webs 48. The slits 47 each lie between the conveyor belts 43.

As is particularly apparent from FIG. 3 and also 5 and 6, the cut-to-size window pieces 32 move in an arcuate manner after the application of adhesive until coming to rest on the envelope blanks 37. During the direct contact between the cut-to-size window pieces 32 and the envelope blanks 37, both briefly move along an arcuate stretch corresponding to the contour of the suction roller 35.

Figure 6:
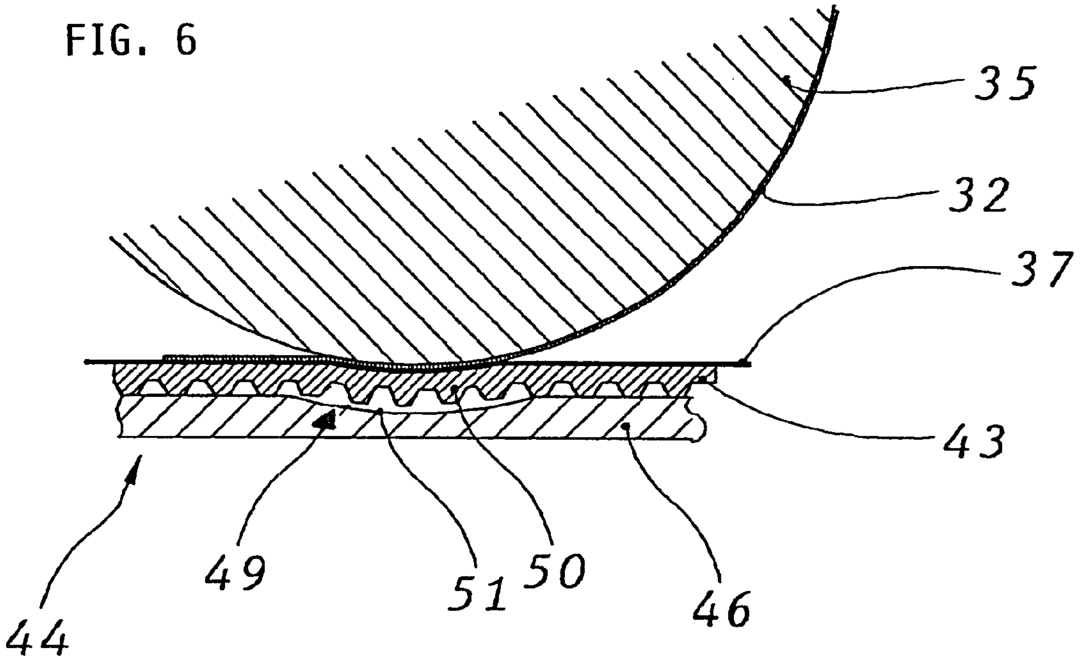
FIG. 6 shows a detail as in FIG. 5 on an even larger scale and with a cut-to-size window piece and with an envelope blank.

The envelope blanks 37 encounter the cut-to-size window pieces 32 retained by the suction roller 35 at an acute angle and not tangentially (FIG. 6). Immediately in the area of contact between the cut-to-size window pieces 32 and the envelope blanks 37 a trough 49 is located in the top 45 of the cover plate 46 of the suction box 44.

This trough 49 is shallow. It has the cross-sectional shape of a segment of a circle or approximately a segment of a circle (FIG. 6). The envelope blanks 37 and the cut-to-size window pieces 32 move parallel to the contour of the suction roller 35 in the contact area. The conveyor belt or belts 43 move or deflect somewhat into the trough 49 in the contact area as is shown in FIG. 6.

Figure 5:
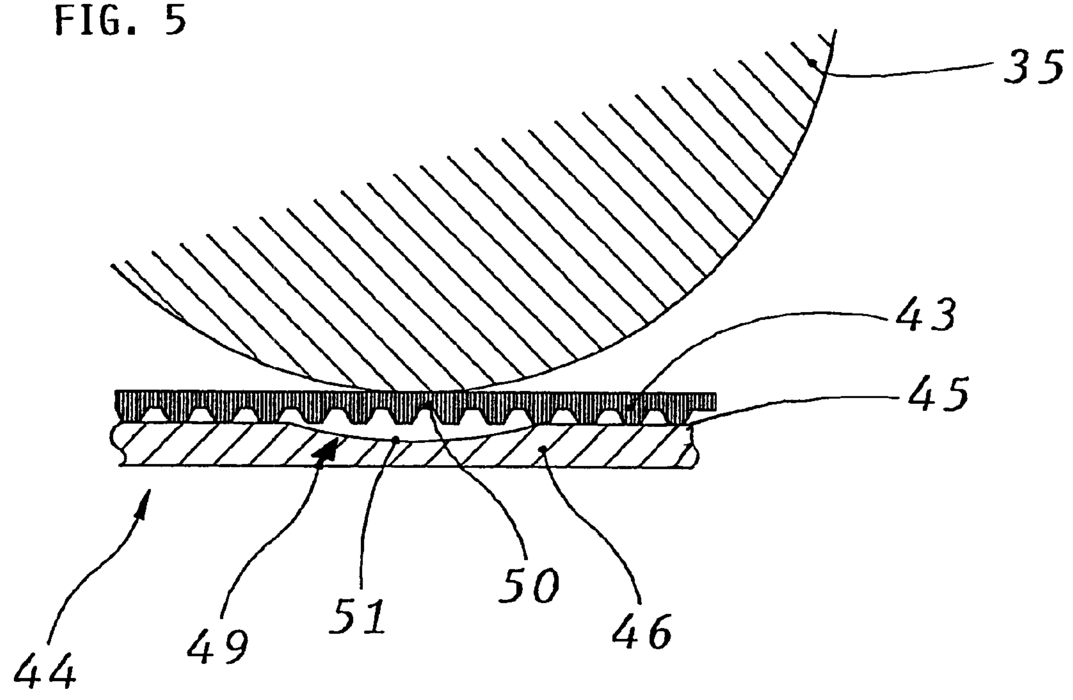
FIG. 5 shows a detail from FIG. 3 on a larger scale and without a cut-to-size window piece and without an envelope blank.

In the position of rest according to FIG. 5, when neither a cut-to-size window piece 32 nor an envelope blank 37 is located between the suction roller 35 and the conveyor belts 43, the conveyor belts 43 extend on the top 45 of the cover plate 46 of the suction box 44 in a linear manner and contact the suction roller 35 tangentially. The conveyor belts 43 do not dip into the trough 49, so that their teeth 50 are at a significant distance above the trough bottom 51. If however the suction roller 35 is conveying a cut-to-size window piece 32 into the area of contact with the trough 49 and the conveyor belts 43 are feeding an envelope blank 37 to the contact station and joining station, the conveyor belts 43, in accordance with the material thickness of the cut-to-size window piece 32 and envelope blank 37, are pressed somewhat into the trough 49, as is shown in FIG. 6. In this situation also, the teeth 50 of the conveyor belts 43 do not contact the trough bottom 51.

During the bringing-together and joining of cut-to-size window piece 32 and envelope blank 37, the conveyor belts 43, not directly supported at the contact station, serve as a counter-tool for the bonding cylinder or the suction roller 35. Along a short arcuate piece, and for a brief period, the conveyor belts 43 together with the cut-to-size window pieces 32 and the envelope blanks 37 follow the curvature of the suction roller 35. The ultimate consequence of this is that the cut-to-size window pieces 32 and the envelope blanks jointly move along an arcuate piece in the contact area during the bringing-together and joining.

The maximum depth of the trough 49 may be approximately 1.5 to 2 mm opposite the plane formed by the top 45 of the suction box 44.

The conveyor belts 43 are prestressed with a constant force during operation. This applies even when they divert somewhat into the trough 49. Because of the belt tension, the cut-to-size window pieces 32 and the envelope blanks 37 are simultaneously pressed against one another under constant force during joining.

An essential point is that the suction belt conveyor device 41 lies in a linear manner in one plane corresponding to the contour of the cover plate 46 both upstream of the trough 49 and downstream of the trough 49. The conveyor belt or belts 43 are therefore also diverted slightly into the trough 49 only briefly at the contact and joining station. The conveyor belt or belts 43 therefore do not extensively follow the curvature of the suction roller 35 serving as a bonding cylinder but do so only significantly more than in a linear manner. Virtually no belt stresses therefore arise, nor are there any displacements as in the case of a belt which lies around a cylindrical contour. At the joining station, the conveyor belt or belts 43 encounter the suction roller 35 tangentially and run in the same plane, again tangentially, away from the suction roller 35 if no material is present between the suction roller 35 and the conveyor belts 43. The deflection of the conveyor belt or belts 43 therefor takes place only in the periphery and as a result of the parts to be joined.

Instead of a plurality of conveyor belts 43, the suction belt conveyor device 41 may also have a single, broad suction belt with suction holes and, if appropriate, one or more narrow, merely supporting belts in addition alongside the latter.

What is claimed is:

1. An apparatus for bonding prefabricated cut-to-size window pieces consisting of transparent window material to envelope blanks having window cut-outs, comprising:

a suction roller serving as a bonding cylinder that brings together the cut-to-size window pieces separated from a material web consisting of the window material with the envelope blanks respectively at a joining location;

a gluing mechanism (40) for applying an adhesive to the cut-to-size window pieces (32), being provided and arranged in such a manner that the respective cut-to-size window piece (32) is already located on the suction roller (35) during the application of the adhesive, with the aid of which suction roller (35) the cut-to-size window piece (32) can be joined immediately subsequently to the respective envelope blank (37) at the joining location; and a suction belt conveyor device (41) provided, at least in a region of the joining location, as a carrier for the envelope blanks (37) and as a counter-tool for the suction roller (35) serving as the bonding cylinder, wherein the suction belt conveyor device (41) has at least one conveyor belt (43) and at least one suction box (44) with a cover plate (46) that supports the at least one conveyor belt (43) and that has apertures or slits (47) therein, and wherein the at least one conveyor belt (43) can be moved in an arcuate manner in a region of the suction roller (35) serving as the bonding cylinder.

2. The apparatus according to claim 1, wherein the respective cut-to-size window piece (32) is located during the application of the adhesive in a first position (A) on the suction roller (35) that is offset in a direction of rotation by less than 180° ahead of a second position (B) in which the respective cut-to-size window piece (3) and the respective envelope blank (37) are joined to one another at the joining location.

3. An apparatus for bonding prefabricated cut-to-size window pieces consisting of transparent window material to envelope blanks having window cut-outs, comprising:

a suction roller serving as a bonding cylinder that brings together the cut-to-size window pieces separated from a material web consisting of the window material with the envelope blanks respectively at a joining location;

a gluing mechanism (40) for applying an adhesive to the cut-to-size window pieces (32), being provided and arranged in such a manner that the respective cut-to-size window piece (32) is already located on the suction roller (35) during the application of the adhesive, with the aid of which suction roller (35) the cut-to-size window piece (32) can be joined immediately subsequently to the respective envelope blank (37) at the joining location; and a suction belt conveyor device (41) provided, at least in a region of the joining location, as a carrier for the envelope blanks (37) and as a counter-tool for the suction roller (35) serving as the bonding cylinder, wherein the suction belt conveyor device (41) has at least one conveyor belt (43) and at least one suction box (44) with a cover plate (46) that supports the at least one conveyor belt (43) and that has apertures or slits (47) therein, and wherein the at least one conveyor belt (43) can be moved slightly concavely to the suction roller (35) in a region of the suction roller (35) serving as the bonding cylinder.

4. The apparatus according to claim 3, wherein the respective cut-to-size window piece (32) is located during the application of the adhesive in a first position (A) on the suction roller (35) that is offset in a direction of rotation by less than 180° ahead of a second position (B) in which the respective cut-to-size window piece (3) and the respective envelope blank (37) are joined to one another at the joining location.

5. An apparatus for bonding prefabricated cut-to-size window pieces consisting of transparent window material to envelope blanks having window cut-outs, comprising:

a suction roller serving as a bonding cylinder that brings together the cut-to-size window pieces separated from a material web consisting of the window material with the envelope blanks respectively at a joining location;

a gluing mechanism (40) for applying an adhesive to the cut-to-size window pieces (32), being provided and arranged in such a manner that the respective cut-to-size window piece (32) is already located on the suction roller (35) during the application of the adhesive, with the aid of which suction roller (35) the cut-to-size window piece (32) can be joined immediately subsequently to the respective envelope blank (37) at the joining location; and a suction belt conveyor device (41) provided, at least in a region of the joining location, as a carrier for the is envelope blanks (37) and as a counter-tool for the suction roller (35) serving as the bonding cylinder, wherein the suction belt conveyor device (41) has at least one conveyor belt (43) and at least one suction box (44) with a cover plate (46) that supports the at least one conveyor belt (43) and that has apertures or slits (47) therein, and wherein the suction box (44) has a trough (49) in a top (45) of the cover plate facing the suction roller (35).

6. The apparatus of claim 5, wherein the respective cut-to-size window piece (32) is located during the application of the adhesive in a first position (A) on the suction roller (35) that is offset in a direction of rotation by less than 180° ahead of a second position (B) in which the respective cut-to-size window piece (3) and the respective envelope blank (37) are joined to one another at the joining location.

7. The apparatus according to claim 5, wherein the at least one conveyor belt (43) can be moved over the trough (49) in a region of the suction roller (35).

8. The apparatus according to claim 5, wherein the trough (49) has a cross-sectional shape of a segment of a circle.

9. The apparatus according to claim 5, wherein the trough (49) is shallow.

10. The apparatus according to claim 5, wherein the trough (49) has a maximum depth of approximately 1.5 to 2 mm opposite the top (45) of the cover plate of the suction box (44) supporting the at least one conveyor belt (43).

11. The apparatus according to clam 5, wherein the suction roller (35), the at least one conveyor belt (43) and the trough (49) are dimensioned so that the at least one conveyor belt (43) without the respective cut-to-size window piece (32) and without the respective envelope blank (37) lies tangentially on the suction roller (35) without dipping into the trough (49).

12. The apparatus according to claim 5, wherein the at least one conveyor belt (43) and the trough (49) are dimensioned so that the at least one conveyor belt (43) does not contact the trough bottom (51), in an operating state with the respective cut-to-size window piece (32) and the respective envelope blank (37) between the suction roller (35) and the at least one conveyor belt (43).

13. The apparatus according to claim 5, wherein the at least one conveyor belt (43) is pretensioned and serves as a counter-tool when the respective cut-to-size window piece (32) and the respective envelope blank (37) are brought together and joined.

* * * * *

UNITED STATES PATENT AND TRADEMARK OFFICE

CERTIFICATE OF CORRECTION

PATENT NO. : 6,634,403 B1
DATED : October 21, 2003
INVENTOR(S) : Bluemle

It is certified that error appears in the above-identified patent and that said Letters Patent is hereby corrected as shown below:

Column 3,
Line 12, after "than", replace "1800" by -- 180º --.

Signed and Sealed this

Twenty-seventh Day of January, 2004

JON W. DUDAS
*Acting Director of the United States Patent and Trademark Office*